(12) United States Patent
Natwick

(10) Patent No.: US 11,046,229 B1
(45) Date of Patent: Jun. 29, 2021

(54) CUP HOLDER

(71) Applicant: Elizabeth Brooke Natwick, Lake Bluff, IL (US)

(72) Inventor: Elizabeth Brooke Natwick, Lake Bluff, IL (US)

( * ) Notice: Subject to any disclaimer, the term of this patent is extended or adjusted under 35 U.S.C. 154(b) by 0 days.

(21) Appl. No.: 16/698,686

(22) Filed: Nov. 27, 2019

(51) Int. Cl.
*B60N 3/10* (2006.01)

(52) U.S. Cl.
CPC ............. *B60N 3/106* (2013.01); *B60N 3/102* (2013.01)

(58) Field of Classification Search
CPC ........ B60N 3/106; B60N 3/102; B60N 3/105; B60N 3/001; B60N 3/002; B60N 3/004; B60N 3/108; A47G 23/0216
See application file for complete search history.

(56) References Cited

U.S. PATENT DOCUMENTS

| | | | | | |
|---|---|---|---|---|---|
| 5,148,755 | A | * | 9/1992 | Morales | A47B 23/02 108/46 |
| 5,423,508 | A | * | 6/1995 | Isenga | B60N 3/102 224/407 |
| 5,997,082 | A | * | 12/1999 | Vincent | B60N 3/108 248/311.2 |
| 6,705,579 | B2 | * | 3/2004 | Yamada | B60N 3/102 224/549 |
| D496,197 | S | * | 9/2004 | Wenzler | B60N 3/102 D6/356 |
| 9,776,721 | B2 | * | 10/2017 | Alford | B64C 1/1484 |
| 2012/0280100 | A1 | * | 11/2012 | Stephan | B60N 3/102 248/311.2 |
| 2015/0115650 | A1 | * | 4/2015 | Zhang | B60N 3/102 296/152 |
| 2019/0232848 | A1 | * | 8/2019 | Hirano | B60N 3/102 |

* cited by examiner

*Primary Examiner* — Anita M King
(74) *Attorney, Agent, or Firm* — Winston & Strawn LLP

(57) ABSTRACT

A cup holder integrated with a passenger seat is disclosed. The cup holder comprises a pair of prongs and a back piece. The prongs and the back piece are configured to move between a stowed upright position and a service position relative to the back of the passenger seat. The back piece is configured to cover the prongs when the prongs and the back piece are in the stowed upright position. The prongs are configured to hold a container in the service position. The back piece is configured to support the container in the service position.

19 Claims, 10 Drawing Sheets

CUP HOLDER

FIELD OF THE INVENTION

The present invention generally relates to a cup holder integrated with a passenger seat, wherein the cup holder includes a pair of prongs and a back piece.

BACKGROUND OF THE INVENTION

Cup holder systems for a passenger seat have been largely unchanged for decades. In general, such cup holder systems include tray tables that move between a stowed upright position and a service position where a tray table is generally horizontal so that items may be supported by the tray table. In the service position, the tray table may be used to support food, drink, and other items for a passenger.

Passenger seats usually do not provide passengers with a cup holder when tray tables are in stowed upright position. Thus, a passenger has to place the tray table in the service position to hold drink on it. Drink on the tray table, however, can be easily spilled because there is no additional support for drink. In addition, the tray table further limits space for passengers during travel.

From the discussion that follows, it will become apparent that the present invention addresses the deficiencies while providing numerous additional advantages and benefits not contemplated or possible with conventional constructions. Embodiments of the present invention are directed to novel cup holders integrated with a passenger seat wherein a back piece of the cup holders covers a pair of prongs of the cup holders in a stowed upright position.

SUMMARY OF THE INVENTION

The invention relates to a cup holder integrated with a passenger seat. The cup holder comprises a pair of prongs. The cup holder further comprises a back piece. The prongs and the back piece are configured to move between a stowed upright position and a service position relative to the back of the passenger seat. The back piece is configured to cover the prongs when the prongs and the back piece are in the stowed upright position. The prongs are configured to hold a container in the service position. The back piece is configured to support the container in the service position.

In some embodiments, the cup holder is embedded in a tray table that is integrated with the back of the passenger seat. The back of the passenger seat preferably comprises an indentation that receives the prongs. The passenger seat comprises an indentation that receives the back piece. In the stowed upright position, the back piece preferably makes a substantially flat outer surface with the passenger seat. In preferred embodiments, the prongs comprise a grip portion and are flexible. The grip portion may be made of metal, rubber, plastic, resin formulation, or a combination thereof. The prongs may also be adjustable such that the prongs are capable of clamping the container regardless of a diameter of the container.

In some desirable embodiments, the passenger seat comprises a locking mechanism that retains the back piece in the stowed upright position. The locking mechanism may be unlocked by manual manipulation such that the back piece can move from the stowed upright position to the service position. The locking mechanism may also comprise a protrusion positioned on the back piece. The passenger seat may further comprise an indentation configured to receive the protrusion such that the back piece is locked into the passenger seat in the stowed upright position.

In preferred embodiments, the prongs and the back piece are substantially parallel in the stowed upright position and the service position. The passenger seat may comprise a device that permits the prongs to move between the stowed upright position and the service position. The device may be a hook stopper. The prongs and the back piece may be positioned such that the prongs move from the service position to the stowed upright position when the back piece moves from the service position to the stowed upright position. The prongs and the back piece may also be positioned such that the prongs move from the stowed upright position to the service position when the back piece moves from the stowed upright position to the service position. Alternatively, the prongs may stay in the stowed upright position when the back piece moves from the stowed upright position to the service position.

BRIEF DESCRIPTION OF THE DRAWINGS

These and other advantages of the present invention will become apparent from the subsequent detailed description of the invention and the appended claims taken in conjunction with the accompanying drawings, wherein:

DETAILED DESCRIPTION OF THE PREFERRED EMBODIMENTS

Figure 1A:
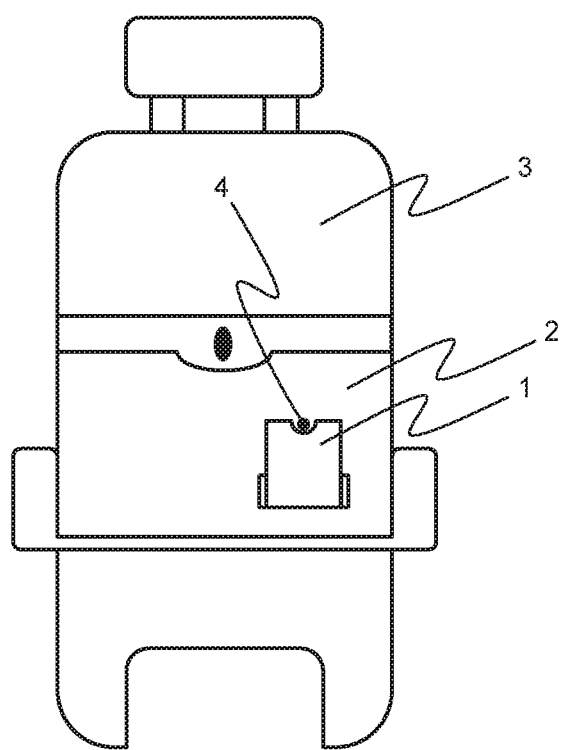
FIG. 1A is a rear view of a passenger seat including a tray table with a cup holder in accordance with one or more embodiments of the present invention.

Further in relation to this, before explaining at least the preferred embodiments of the invention in greater detail, it is to be understood that the invention is not limited in its application to the details of construction and to the arrangements of the components set forth in the following description, or illustrated in the appended Figures. It would be understood by those of ordinary skill in the art that embodiments beyond those described herein are contemplated, and the embodiments can be practice and carried out in a plurality of different ways. Also it is to be understood that the terminology used herein is for the purpose of description and should not be regarded as a limiting factor.

As such, those having ordinary skill in the art will appreciate that the conception upon which this disclosure is based may also be utilized as a basis for designing other structures for carrying out the several purposes of the present invention. It is therefore equally important that the claims be regarded as including such equivalent constructions, insofar as they do not depart from the spirit and scope of the present invention.

The terms used herein refer to that which the ordinary artisan would understand such term to mean based on the contextual use of such term herein. To the extent that the meaning of a term used herein as understood by the ordinary artisan based on the contextual use of such term differs in any way from any particular dictionary definition of such term, it is intended that the meaning of the term as understood by the ordinary artisan will prevail.

In accordance with the principles of the present invention, a cup holder integrated with a back of a passenger seat is provided. In some embodiments, a cup holder is embedded in a tray table that is integrated with the back of the passenger seat. The back of the passenger further includes, but are not limited to, a back of an armrest or the other passenger's seat. The cup holder can be integrated with any parts of a back of the passenger seat other than the tray table. It is important to be able to provide a cup holder without placing the tray table in a stowed upright position. It is also critical for a cup holder not to limit passenger's space further. A cup holder also needs to be kept free from dust or other impurities. The present embodiments of cup holders were found to accomplish such objective but the solution was only found through significant effort, experimentation, and testing. The cup holder is also able to provide a beverage container or a cup with more complete support by prongs and a back piece.

Now, generally referring to the drawings in which like numerals represent like components throughout the several views, the preferred embodiments of the present invention are next described. The following description of one or more preferred embodiment(s) is merely exemplary in nature and is in no way intended to limit the invention, its application, or uses.

FIGS. 1-4 depict the various embodiments of the present invention. It is, however, understood that the present invention is not limited to the embodiments described in the FIGS. 1-4.

Figure 1B:
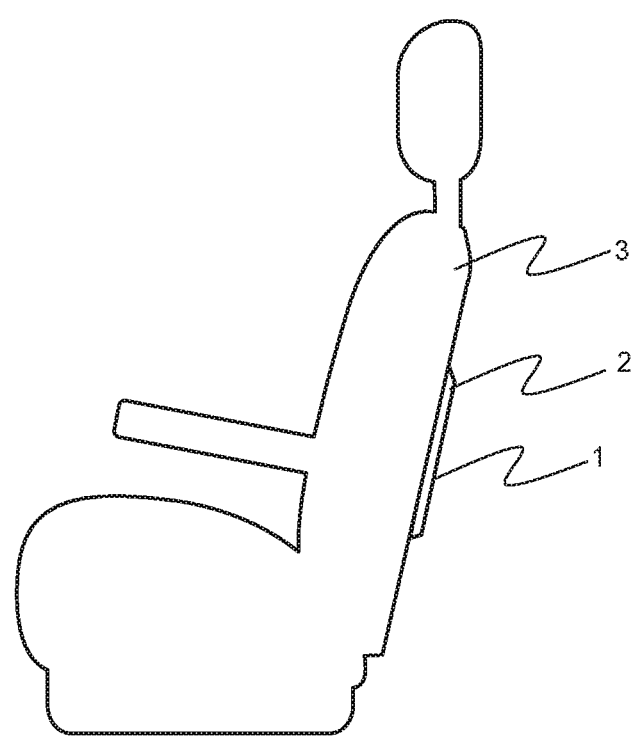
FIG. 1B is a side view of a passenger seat including a tray table with a cup holder in accordance with one or more embodiments of the present invention.

In a first embodiment, the present invention specifically relates to a cup holder 1 integrated with a tray table 2 for a passenger seat 3, as depicted in FIGS. 1A-1B. FIG. 1A is a rear view of a passenger seat 3 including a tray table 2 with a cup holder 1. FIG. 1B is a side view of a passenger seat 3 including a tray table 2 with a cup holder 1. As shown, the cup holder 1 is embedded in the tray table 2. In a word, the cup holder 1 is a built-in cup holder. Alternatively, it is understood that the cup holder 1 can be integrated with any parts of a back of the passenger seat 3 other than the tray table 2.

In the embodiments wherein the cup holder 1 is embedded in the tray table 2, the cup holder 1 is not removable from the tray table 2. The cup holder 1 comprises a slight indentation 4 at the top of the stowed cup holder 1 for finger to pull down the cup holder 1. A user can easily push or pull the indentation 4 to pull down the cup holder 1. In the stowed upright position, the cup holder 1, more accurately back piece, preferably makes a substantially flat outer surface with the tray table 2. Alternatively, in the stowed upright position, the cup holder 1, more accurately back piece, may not make a substantially flat outer surface with the tray table 2. The passenger seat 3 may be of any vehicle such as, but not limited to, automobiles, trucks, trains, airplanes, boats, and large vessels. It is understood that the cup holder 1 can be attached to or embedded in any tray table of a passenger seat. While the cup holder 1 is placed in the right bottom portion of the tray table 2, it can be placed in any portion of the tray table. It is also possible that more than one cup holder 1 is placed in the tray table 2.

Figure 2A:
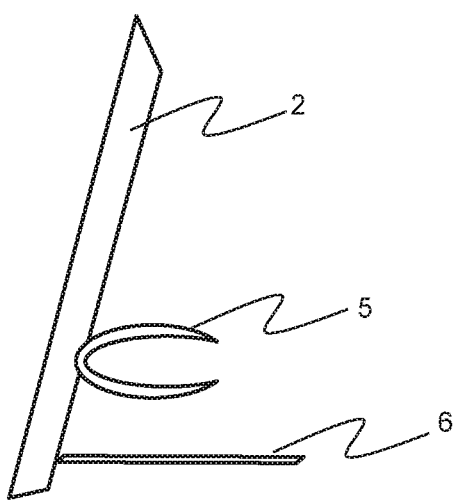
FIG. 2A is a side view of a tray table with a pair of prongs and a back piece in a service position in accordance with one or more embodiments of the present invention.
Figure 2B:
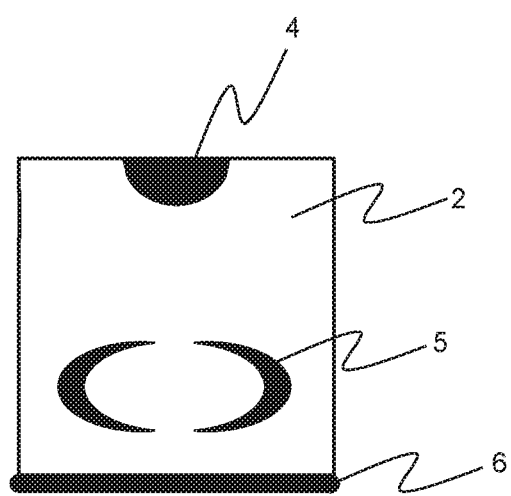
FIG. 2B is a front view of a tray table with a pair of prongs and a back piece in a service position in accordance with one or more embodiments of the present invention.

As shown in FIGS. 2A-2B, the cup holder 1 comprises a pair of prongs 5 and a back piece 6. FIG. 2A is a side view of a tray table 2 with a pair of prongs 5 and a back piece 6 in a service or active position. FIG. 2B is a front view of a tray table 2 with a pair of prongs 5 and a back piece 6 in a service or active position. The back piece 6 is configured to cover the prongs 5 when the prongs 5 and the back piece 6 are in the stowed upright position. In one embodiment, the dimensions of the built-in cup holder 1 is approximately 3"×4.5" or 5". Any dimensions that allows the back piece 6 to cover the prongs 5 can be used in the present invention. Because the back piece 6 covers the prongs 5 in the stowed upright position, the prongs 5 can be kept free from dust and all impurities. In addition, in the stowed upright position, the back piece 6 can make a substantially flat outer surface with the tray table 2. The prongs 5 are configured to hold a container (not shown) in the service or active position. The back piece 6 is configured to support the container in the service or active position. The prongs 5 may be adjustable such that the prongs 5 are capable of clamping a beverage container or cup regardless of a diameter of the container of the cup. Alternatively, the prongs 5 may not be adjustable such that a beverage container or a cup with a standardized size or diameter is secured by the prongs 5. The prongs 5 may comprise a grip portion and be flexible. While a pair of prongs 5 are desirable, it is understood that any configuration or number of prongs that a person skilled in the art would consider or be able to envision can be used in the present invention.

Figure 3A:
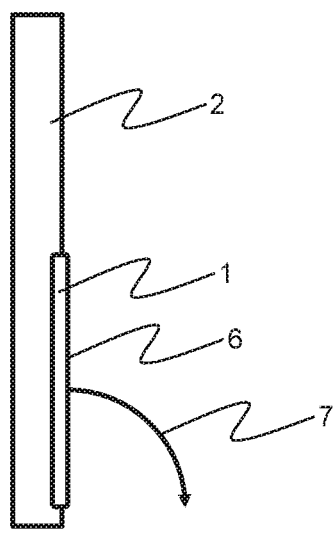
FIG. 3A is a side view of a tray table with a cup holder in a stowed upright position in accordance with one or more embodiments of the present invention.
Figure 3B:
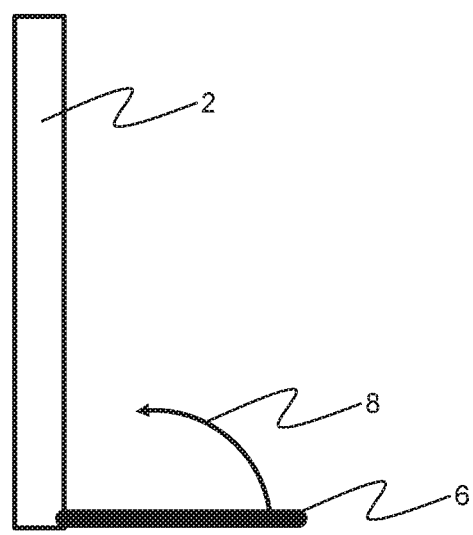
FIG. 3B is a side view of a tray table with a back piece in a service position in accordance with one or more embodiments of the present invention.
Figure 3C:
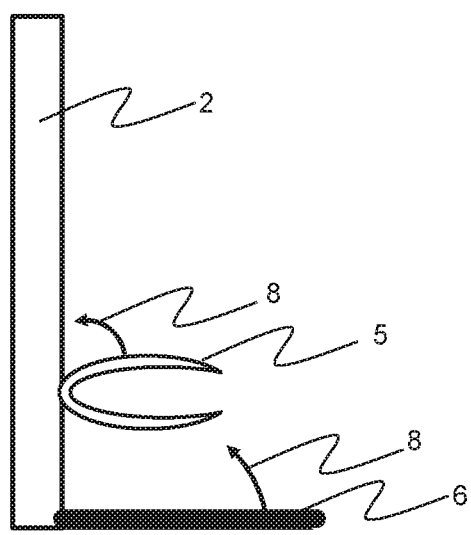
FIG. 3C is a side view of a tray table with a cup holder and a back piece in a service position in accordance with one or more embodiments of the present invention.

In general, the prongs 5 and the back piece 6 are configured to move between a stowed upright position and a service or active position relative to the passenger seat 3, as described in FIGS. 3A-3D. FIG. 3A illustrates a side view of a tray table 2 with a cup holder 1 in a stowed upright position. A user can move the cup holder 1 or the back piece 6 in a direction 7 to a service or active position, as depicted in FIG. 3B. FIG. 3B illustrates a side view of a tray table 2 with a back piece 6 in a service or active position. In the embodiment, the prongs 5 are not shown because the prongs 5 are still embedded in the tray table 2. It is understood that any device that holds the prongs 5 in the stowed upright position can be used in the present invention. Thus, a user has to pull out the back piece 6 and the prongs 5 individually if he or she wants to use both. If the user needs the back piece 6 only, he or she can easily pull out the back piece 6. The prongs 5 is still going to be placed in the tray table 2 unless the user pulls it out subsequently. If the user wants to position the back piece 6 in a stowed upright position, he or she can easily push it up toward the tray table 2 in a direction 8.

Figure 3D:
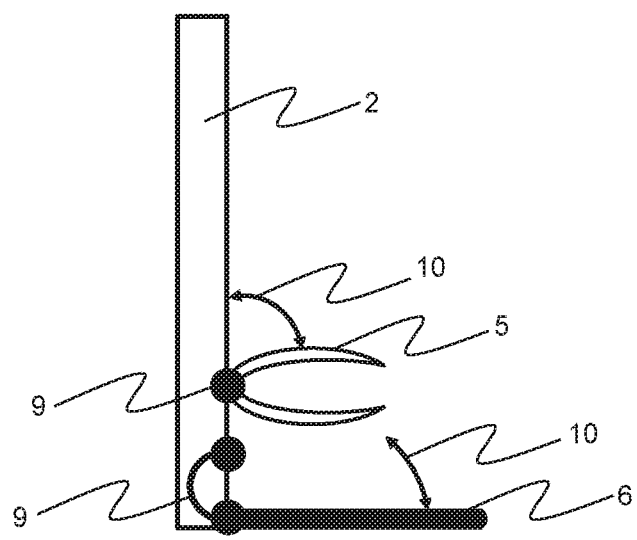
FIG. 3D is a side view of a tray table with a device that permits cup holder and a back piece to move between a stowed upright position and a service position in accordance with one or more embodiments of the present invention.

Alternatively, the cup holder can be designed such that the prongs 5 is pulled out once a user pulls out the back piece 6, as shown in FIG. 3D. Because there is nothing holding the prongs 5 in the stowed upright position, the prongs 5 covered by the back piece 6 in a stowed upright position would pull out by gravity when the user pulls out the back piece 6. If the user wants to position the prongs 5 and the back piece 6 in a stowed upright position, he or she can easily push the back piece 6 up toward the tray table 2 in a direction 8. Accordingly, this design allows a user to prepare the cup holder in a service or active position or a stowed upright position with one quick touch. In some embodiments, a device 9 is installed in the tray table 2 to permit the prongs 5 and the back piece 6 to move between a stowed upright position and a service or active position, as embodied in FIG. 3D. The device 9 is preferably a hook stopper or a hinge. It is understood that any configuration or kind of device that a person skilled in the art would consider or be able to envision can be used in the present invention. In particular, two devices 9 prevent the prongs 5 and the back piece 9 from moving beyond a service or active position, respectively. For example, the devices 9 keep the prongs 5 and the back piece 6 at a 90-degree angle relative to the tray table 2. When the prongs 5 and the back piece 6 move back to the stowed upright position from the service or active position, the devices 9 do not prevent them from doing so. Accordingly, the device 9 allows the prongs 5 and back piece 6 to move back and forth between a stowed upright position and a service or active position in directions 10. Preferably, the prongs 5 and the back piece 6 are substantially parallel in the stowed upright position and the service or active position.

Figure 4A:
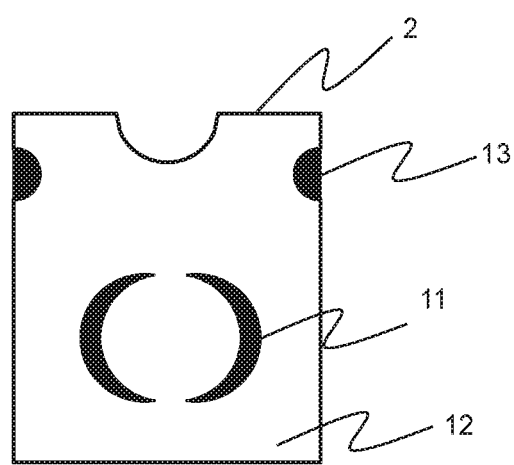
FIG. 4A is a front view of a tray table that includes indentations that receive prongs and a back piece in accordance with one or more embodiments of the present invention.
Figure 4B:
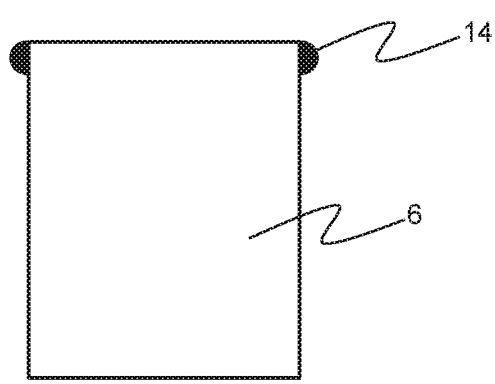
FIG. 4B is a front view of a back piece in a stowed upright position in accordance with one or more embodiments of the present invention.

In desirable embodiments, the tray table 2 comprises an indentation 11 that receives the prongs 5 when the prongs 5 are not in use, as shown in FIG. 4A. The indentation 11 and the prongs 5 are similar in shape and size. The indentation 11 can be slightly bigger than the prongs 5 to receive them easily. The tray table 2 further comprises an indentation 12 that receives the back piece 6. The indentation 12 and the back piece 6 are similar in shape and size. The indentation 12 can be slightly bigger than the prongs 5 to receive them easily. The tray table 2 may comprise a locking mechanism that retains the back piece 6 in the stowed upright position. The locking mechanism may be configured to be unlocked by manual manipulation such that the back piece 6 can move from the stowed upright position to the service or active position. The locking mechanism may also comprise protrusions or nodules 14 positioned on the back piece 6, as described in FIG. 4B. The tray table 2 may further comprise indentations 13 located at the top of either side configured to receive the protrusions or nodules 14 such that the back piece 6 is locked into the tray table 2 in the stowed upright position, which allows a tight fit in a firm, stowed upright position. It will essentially snap or click into a locked position.

Unless defined otherwise, all technical and scientific terms used herein have same meaning as commonly understood by the person of ordinary skill in the art to which this invention belongs. Thus the scope of the embodiments of the present invention should be determined by the appended claims and their legal equivalents rather than by the Figures.

What is claimed is:

1. A cup holder integrated with a back of a passenger seat comprising:
   a pair of prongs; and
   a back piece;
   wherein the prongs and the back piece are configured to move between a stowed upright position and a service position relative to the back of the passenger seat,
   wherein the back piece is configured to cover the prongs when the prongs and the back piece are in the stowed upright position;
   wherein the prongs are configured to hold a container in the service position;
   wherein the back piece is configured to support the container in the service position, and
   wherein the cup holder is embedded in a tray table that is integrated with the back of the passenger seat.

2. The cup holder of claim 1, wherein the back of the passenger seat comprises an indentation that receives the prongs.

3. The cup holder of claim 1, wherein the back of the passenger seat comprises an indentation that receives the back piece.

4. The cup holder of claim 1, wherein the back piece makes a substantially flat outer surface with the back of the passenger seat.

5. The cup holder of claim 1, wherein the prongs comprise a grip portion.

6. The cup holder of claim 1, wherein the prongs are flexible.

7. The cup holder of claim 1, wherein the prongs are adjustable such that the prongs are capable of clamping the container regardless of a diameter of the container.

8. The cup holder of claim 1, wherein the back of the passenger seat comprises a locking mechanism that retains the back piece in the stowed upright position.

9. The cup holder of claim 8, wherein the locking mechanism is unlocked by manual manipulation such that the back piece can move from the stowed upright position to the service position.

10. The cup holder of claim 8, wherein the locking mechanism comprises a protrusion positioned on the back piece.

11. The cup holder of claim 10, wherein the back of the passenger seat further comprises an indentation configured to receive the protrusion such that the back piece is locked into the back of the passenger seat in the stowed upright position.

12. The cup holder of claim 1, wherein the prongs and the back piece are substantially parallel in the stowed upright position and the service position.

13. The cup holder of claim 1, wherein the back of the passenger seat comprises a device that permits the prongs to move between the stowed upright position and the service position.

14. The cup holder of claim 13, wherein the device is a hook stopper.

15. The cup holder of claim 1, wherein the back of the passenger seat comprises a device that permits the back piece to move between the stowed upright position and the service position.

16. The cup holder of claim 15, wherein the device is a hook stopper.

17. The cup holder of claim 1, the prongs and the back piece are positioned such that the prongs move from the service position to the stowed upright position when the back piece moves from the service position to the stowed upright position.

18. The cup holder of claim 1, the prongs and the back piece are positioned such that the prongs move from the stowed upright position to the service position when the back piece moves from the stowed upright position to the service position.

19. The cup holder of claim 1, the prongs stay in the stowed upright position when the back piece moves from the stowed upright position and the service position.

\* \* \* \* \*